(12) United States Patent
Yamamoto et al.

(10) Patent No.: US 10,190,625 B2
(45) Date of Patent: Jan. 29, 2019

(54) THRUST ROLLER BEARING CAGE AND METHOD FOR MANUFACTURING THE SAME

(71) Applicant: NTN CORPORATION, Osaka (JP)

(72) Inventors: Kazuyuki Yamamoto, Shizuoka (JP); Hisataka Hasegawa, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/523,407

(22) PCT Filed: Nov. 6, 2015

(86) PCT No.: PCT/JP2015/081272
§ 371 (c)(1),
(2) Date: May 1, 2017

(87) PCT Pub. No.: WO2016/080207
PCT Pub. Date: May 26, 2016

(65) Prior Publication Data
US 2017/0307006 A1 Oct. 26, 2017

(30) Foreign Application Priority Data

Nov. 18, 2014 (JP) .................................. 2014-233493
Dec. 15, 2014 (JP) .................................. 2014-253274
(Continued)

(51) Int. Cl.
*F16C 19/46* (2006.01)
*F16C 33/54* (2006.01)
(Continued)

(52) U.S. Cl.
CPC ............ *F16C 19/463* (2013.01); *B21D 53/12* (2013.01); *F16C 19/305* (2013.01);
(Continued)

(58) Field of Classification Search
CPC ..... F16C 19/463; F16C 19/305; F16C 33/546
See application file for complete search history.

(56) References Cited

U.S. PATENT DOCUMENTS 2,978,282 A * 4/1961 Fisher ................... F16C 19/305
384/623
3,240,542 A 3/1966 Jahn
(Continued)

FOREIGN PATENT DOCUMENTS

CN 101600891 12/2009
CN 102869893 1/2013
(Continued)

OTHER PUBLICATIONS

Jianguo Lu et al., "China Electrical Canon", vol. 11, Feb. 28, 2009.

*Primary Examiner* — Thomas R Hannon
(74) *Attorney, Agent, or Firm* — Clark & Brody

(57) ABSTRACT

A thrust roller bearing cage (11) includes a thrust roller bearing (20) and a plurality of pockets (21) accommodating rollers (13). The thrust roller bearing cage (11) includes: a radially outer area bent portion (41) formed by bending an area located radially outside the pockets (21) inward in a radial direction; and projecting portions (44) that are formed in a tip end of the radially outer area bent portion (41) at positions aligned with the pockets (21) and project inward in the radial direction beyond radially outer edges of the pockets (21) so as to contact end faces (16) of the rollers (13) accommodated in the pockets (21). The projecting portions (44) have a width that is ⅓ or more and ⅔ or less of the width of the pockets (21).

9 Claims, 9 Drawing Sheets

(30) Foreign Application Priority Data

| | | |
|---|---|---|
| Jan. 9, 2015 | (JP) | 2015-003487 |
| Jan. 9, 2015 | (JP) | 2015-003505 |
| Jan. 9, 2015 | (JP) | 2015-003508 |
| Jan. 9, 2015 | (JP) | 2015-003512 |

(51) Int. Cl.

| | |
|---|---|
| *F16C 19/30* | (2006.01) |
| *B21D 53/12* | (2006.01) |
| *F16C 33/66* | (2006.01) |

(52) U.S. Cl.
CPC .......... *F16C 33/541* (2013.01); *F16C 33/546* (2013.01); *F16C 33/6681* (2013.01); *F16C 2220/42* (2013.01); *F16C 2240/30* (2013.01); *F16C 2326/01* (2013.01)

(56) References Cited

U.S. PATENT DOCUMENTS

| | | | | |
|---|---|---|---|---|
| 3,240,543 | A | | 3/1966 | Benson |
| 3,652,141 | A | * | 3/1972 | Husten ............... F16C 19/30 384/455 |
| 5,630,670 | A | * | 5/1997 | Griffin ............... F16C 19/30 384/606 |
| 6,742,934 | B2 | * | 6/2004 | Matsuyama ........ F16C 33/3856 384/572 |
| 7,837,394 | B2 | * | 11/2010 | Takamizawa ....... F16C 33/4635 384/572 |
| 8,480,309 | B2 | * | 7/2013 | Ince .................... F16C 33/546 384/575 |
| 8,627,570 | B2 | * | 1/2014 | Takamizawa ....... F16C 33/4635 29/898 |
| 9,593,714 | B1 | * | 3/2017 | Ince .................... F16C 33/4676 |
| 9,939,010 | B2 | * | 4/2018 | Yamamoto ............. F16C 19/463 |
| 2007/0206894 | A1 | * | 9/2007 | Kotani .................... F16C 19/30 |
| 2008/0019827 | A1 | | 1/2008 | Takannizawa et al. |
| 2011/0229067 | A1 | * | 9/2011 | Brown .................... F16C 19/26 384/572 |
| 2013/0089286 | A1 | | 4/2013 | Fugel et al. |
| 2016/0333936 | A1 | * | 11/2016 | Kono .................... F16C 19/305 |

FOREIGN PATENT DOCUMENTS

| | | |
|---|---|---|
| JP | 08-200377 | 8/1996 |
| JP | 3037788 | 5/1997 |
| JP | 09-324817 | 12/1997 |
| JP | 10-220482 | 8/1998 |
| JP | 11-123458 | 5/1999 |
| JP | 2002-250347 | 9/2002 |
| JP | 2004-176781 | 6/2004 |
| JP | 2006-057742 | 3/2006 |
| JP | 2006-250316 | 9/2006 |
| JP | 2006-250327 | 9/2006 |
| JP | 2008-002503 | 1/2008 |
| JP | 2009-047239 | 3/2009 |
| JP | 2009-174637 | 8/2009 |
| JP | 2009-191981 | 8/2009 |
| JP | 2009-275794 | 11/2009 |
| JP | 2011-106637 | 6/2011 |
| JP | 2011-144866 | 7/2011 |
| JP | 2014-095458 | 5/2014 |
| JP | 2015-055274 | 3/2015 |
| WO | 2009/086965 | 7/2009 |

* cited by examiner

THRUST ROLLER BEARING CAGE AND METHOD FOR MANUFACTURING THE SAME

TECHNICAL FIELD

The present invention relates to thrust roller bearing cages (hereinafter sometimes simply referred to as the "cages") and methods for manufacturing the same, and more particularly relates to a thrust roller bearing cage that is manufactured by using a press and a method for manufacturing the same.

BACKGROUND ART

For example, thrust roller bearings that support thrust loads are sometimes placed at such locations in automatic transmissions for automobiles, car air conditioner compressors, etc. that are subjected to thrust loads. For improved fuel efficiency and power saving, it is desired to reduce running torque of such thrust roller bearings. A thrust roller bearing includes bearing rings arranged in the direction of the rotation axis of the thrust roller bearing, a plurality of needle rollers that roll on raceway surfaces of the bearing rings, and a cage that retains the plurality of needle rollers. Some cages are manufactured by bending a steel sheet and then punching out pockets that accommodate the rollers.

A technique relating to the cages included in such thrust roller bearings is disclosed in, e.g., Japanese Unexamined Patent Publication No. H10-220482 (Patent Literature 1). The thrust roller bearing cage of Patent Literature 1 includes an annular body formed by cutting, punching, etc. and projecting portions formed in a radially outer part of the annular body. The projecting portions are formed such that those parts of the radially outer end face of the folded part of the annular body which are located at the positions of the pockets project inward in the radial direction, and the tip ends of the projecting portions face approximately the centers of the end faces of the rollers. Patent Literature 1 discloses that this thrust roller bearing cage reduces running torque of the rollers as the tip ends of the projecting portions contact the rollers at positions near the rotation center of the rollers.

CITATION LIST

Patent Literatures

Patent Literature 1: Japanese Unexamined Patent Application Publication No. H10-220482

SUMMARY OF INVENTION

Technical Problem

However, the thrust roller bearing of Patent Literature 1 is disadvantageous in that the thrust roller bearing may not have sufficient strength and/or lubricant may not flow satisfactorily in the thrust roller bearing.

It is an object of the present invention to provide a thrust roller bearing cage that improves strength and allows a satisfactory flow of lubricant and a method for manufacturing the same.

Solution to Problem

The inventors found that the above problems of the thrust roller bearing of Patent Literature 1, namely insufficient strength and an unsatisfactory flow of lubricant, arise from the shape of the projecting portions. The inventors' diligent research has led to the discovery that improved strength and a satisfactory flow of lubricant can be achieved when the width of the projecting portions is within a predetermined range.

A thrust roller bearing cage according to the present invention is a thrust roller bearing cage included in a thrust roller bearing and including a plurality of pockets accommodating rollers. The thrust roller bearing cage includes: a radially outer area bent portion formed by bending an area located radially outside the pockets inward in a radial direction; and projecting portions that are formed in a tip end of the radially outer area bent portion at positions aligned with the pockets and project inward in the radial direction beyond radially outer edges of the pockets so as to contact end faces of the rollers accommodated in the pockets. The projecting portions have a width that is ⅓ or more and ⅔ or less of a width of the pockets.

A method for manufacturing a thrust roller bearing cage according to the present invention is a method for manufacturing a thrust roller bearing cage included in a thrust roller bearing and including a plurality of pockets accommodating rollers. The method includes the steps of: preparing a cage material that will later become the cage; forming an outer shape of the cage material so that the outer shape has portions that will later become projecting portions projecting inward in a radial direction beyond radially outer edges of the pockets so as to contact end faces of the rollers accommodated in the pockets; forming the pockets in the cage material; and forming a radially outer area bent portion by bending an area of the cage material which is located radially outside the pockets inward in the radial direction. In the step of forming the outer shape, the outer shape is formed so as to have the portions that will later become the projecting portions having a width that is ⅓ or more and ⅔ or less of a width of the pockets.

According to the thrust roller bearing cage of the present invention and the method for manufacturing the same, since the width of the projecting portions is ⅓ or more of the width of the pockets, strength of the projecting portions can be improved. Since the width of the projecting portions is ⅔ or less of the width of the pockets, clearance that is formed in each pocket with the end face of the roller being in contact with the projecting portion is large enough for lubricant to flow therethrough. A satisfactory flow of lubricant can thus be achieved. Accordingly, the thrust roller bearing cage of the present invention and the method for manufacturing the same can achieve improved strength and a satisfactory flow of lubricant.

In the thrust roller bearing cage according to the present invention, it is preferable that the projecting portions have an arc shape as viewed in plan, and the arc of the projecting portions have a radius of 0.4 mm or more and 0.7 mm or less.

In the method for manufacturing the thrust roller bearing cage according to the present invention, it is preferable that, in the step of forming the outer shape, the outer shape be formed so as to have the portions that will later become the projecting portions having an arc shape with a radius of 0.4 mm or more and 0.7 mm or less as viewed in plan.

Since the projecting portions have an arc shape, the projecting portions can be prevented from being deformed when the area located radially outside the pockets is bent to form the radially outer area bent portion. In the case where the radius of the arc of the projecting portions is 0.4 mm or more, the projecting portions can further be prevented from being deformed when the bending process is performed, and strength of the projecting portions can be improved. Even if those parts of the projecting portions which contact the rollers become worn through the use of the thrust roller bearing cage, the area of those parts of the projecting portions which contact the rollers increases only slightly in the case where the radius of the arc of the projecting portions is 0.7 mm or less. Reduced running torque can therefore be maintained even if the thrust roller bearing cage is used for a long period of time.

In the thrust roller bearing cage according to the present invention, it is preferable that areas of the projecting portions which are to contact the end faces of the rollers be subjected to a press-flattening process.

It is preferable that the method for manufacturing the thrust roller bearing cage according to the present invention further include the step of: press-flattening areas of the projecting portions which are to contact the end faces of the rollers.

Since the areas of the projecting portions which are to contact the end faces of the rollers are subjected to the press-flattening process, this can reduce the risk that discontinuity of a lubricant film will be caused during rotation of the bearing by the sliding motion of the end faces of the rollers on the areas of the projecting portions which contact the end faces of the rollers. This improves lubricating properties in the contact areas and reduces what is called aggression of the rollers against the projecting portions of the cage. Such a thrust roller bearing cage can thus further reduce the running torque of the bearing.

As used herein, the "press-flattening process" means a process in which, in the step of forming the radially outer area bent portion, the projecting portions are pressed outward in the radial direction by using a radially outer surface of a die that serves as a stopper to control the amount of collapse, in order to smooth the rough surfaces of the projecting portions before and after the process. Specifically, the press-flattening process can smooth a press-sheared surface or a fracture surface, which is formed in the step of forming the outer shape, to arithmetic mean roughness Ra (JIS B 0601) of about 2 μm or less.

In the thrust roller bearing cage according to the present invention, it is preferable that the projecting portions be formed by bending a radially outer area of the cage obliquely inward in the radial direction.

In the method for manufacturing the thrust roller bearing cage according to the present invention, it is preferable that, in the step of forming the radially outer area bent portion, the area of the cage material which is located radially outside the pockets be bent obliquely inward in the radial direction.

The radially outer area bent portion is formed by bending the area located radially outside the pockets obliquely inward in the radial direction. Accordingly, the projecting portions formed in the tip end of the radially outer area bent portion have a smaller contact area with the rollers than in the case where the area located radially outside the pockets is not tilted (the tilt angle is 0°) as in Patent Literature 1. When the rollers are biased from the central axis of the cage toward the outside in the radial direction by a rotational centrifugal force of the rollers, friction is generated between each roller and the part of each projecting portion which contacts the roller. However, since the projecting portions have a smaller contact area with the rollers, rotational resistance can be reduced. Running torque can therefore be reduced.

Advantageous Effects of Invention

The thrust roller bearing cage of the present invention and the method for manufacturing the same can achieve improved strength and a satisfactory flow of lubricant.

DESCRIPTION OF EMBODIMENTS

Figure 1:
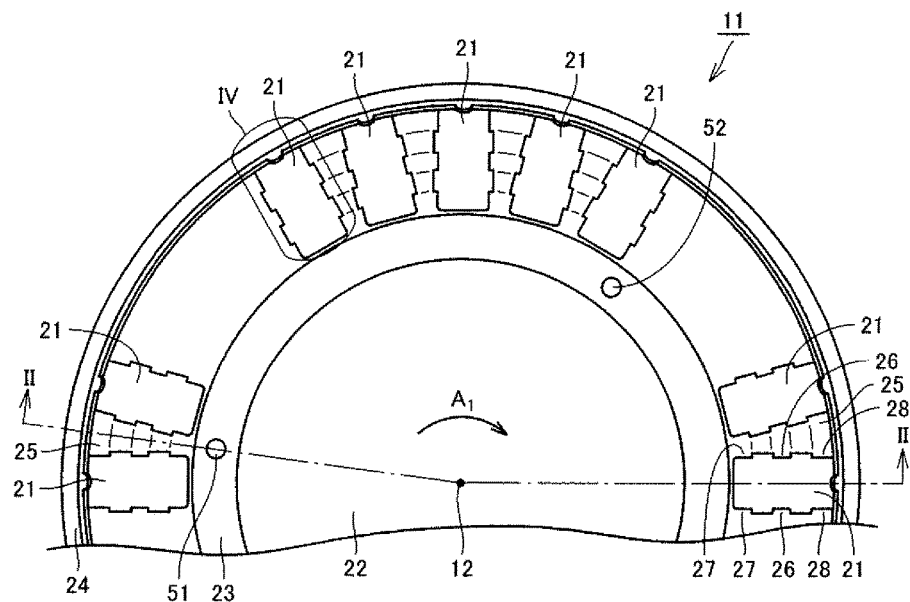
FIG. 1 shows a part of a thrust roller bearing cage according to an embodiment of the present invention.

Embodiments of the present invention will be described below with reference to the drawings. In the figures described below, the same or corresponding portions are denoted with the same reference characters, and description thereof will not be repeated.

Figure 2:
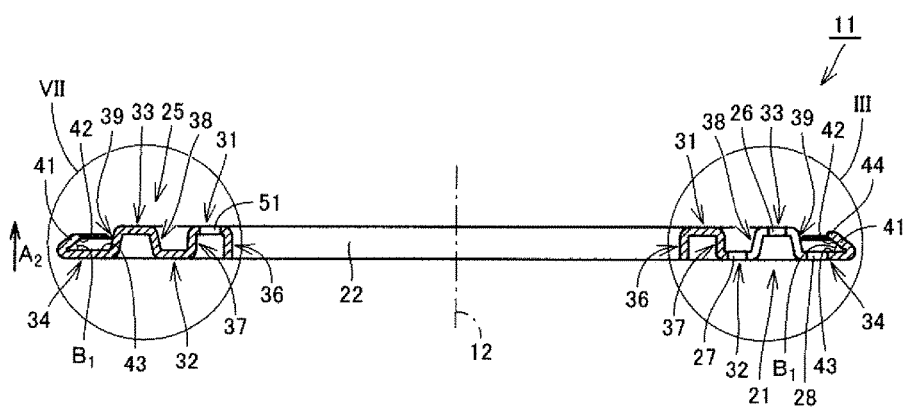
FIG. 2 is a sectional view of the thrust roller bearing cage shown in FIG. 1.
Figure 3:
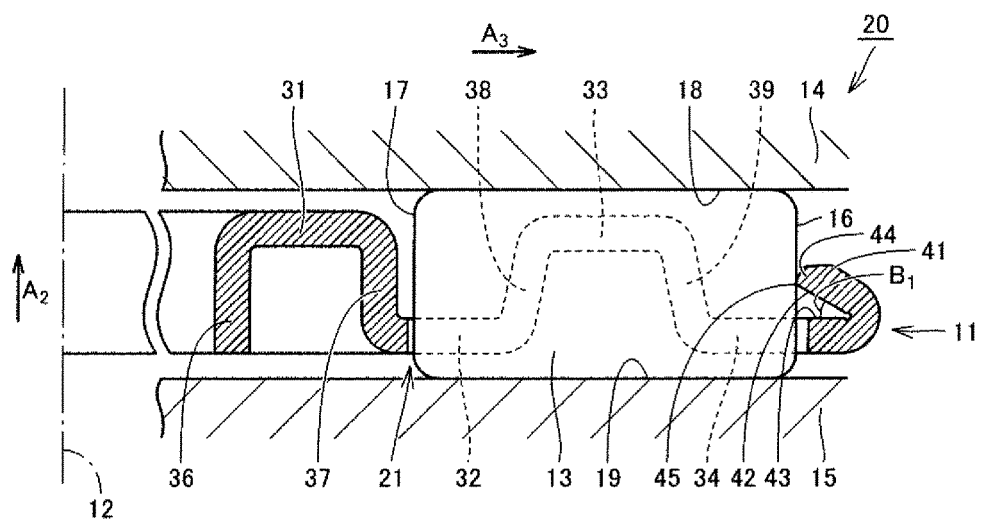
FIG. 3 is an enlarged sectional view showing a part of the thrust roller bearing cage shown in FIG. 2.
Figure 4:
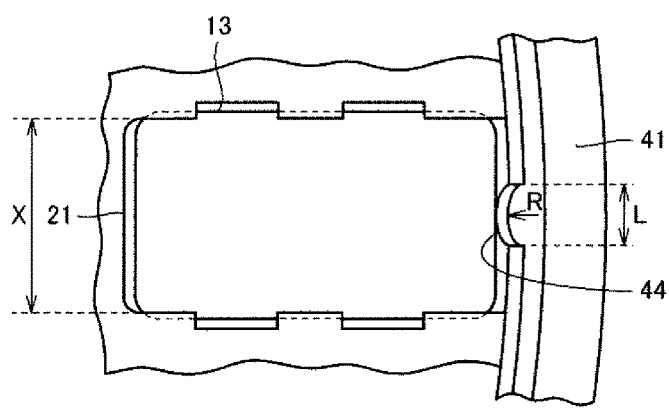
FIG. 4 is an enlarged sectional view showing a part of the thrust roller bearing cage shown in FIG. 2.

FIG. 1 shows a part of a thrust roller bearing cage 11 according to an embodiment of the present invention. FIG. 1 shows the cage 11 as viewed in the direction of the rotation axis of the cage 11. FIG. 2 is a sectional view of the thrust roller bearing cage 11 shown in FIG. 1. FIG. 2 shows the cage 11 taken along line II-II in FIG. 1. Specifically, a portion having a pocket, which will be described later, is shown in section on the right side of FIG. 2, and a portion having a pillar, which will be described later, is shown in section on the left side of FIG. 2. FIG. 3 is an enlarged sectional view showing a part of the thrust roller bearing cage 11 shown in FIG. 2. The enlarged sectional view in FIG. 3 shows the area indicated by III in FIG. 2. In FIGS. 2 and 3, the rotation axis 12 of the cage 11 is shown by an alternate long and short dash line. For ease of understanding, FIG. 3 shows a needle roller 13 accommodated in a pocket 21, which will be described later, and a part of a pair of bearing rings 14, 15 disposed on both sides of the cage 11, in the direction of the rotation axis of the cage 11. FIG. 4 is an enlarged plan view showing a part of the thrust roller bearing cage 11 shown in FIGS. 1 and 2, namely an enlarged plan view of the area indicated by VI in FIG. 1. For ease of understanding, FIG. 4 shows a needle roller 13 accommodated in a pocket 21 that will be described later. The direction perpendicular to the plane of paper of FIGS. 1 and 4 and the vertical direction in FIGS. 2 and 3 are the direction of the rotation axis of the cage 11. The direction shown by arrow $A_1$ or its opposite direction in FIG. 1 is the circumferential direction. For ease of understanding, the upper side in FIGS. 2 and 3 is defined as the upper side in the axial direction. That is, the direction shown by arrow $A_2$ in FIGS. 2 and 3 is the upward direction. The lateral direction in FIGS. 2 and 3 is the radial direction. The direction shown by arrow $A_3$ in FIG. 3 is the radially outward direction.

First, the configuration of the thrust roller bearing cage 11 according to the embodiment of the present invention will be described with reference to FIGS. 1 to 4. The thrust roller bearing cage 11 according to the embodiment of the invention is in the shape of a disc and has a through bore 22 extending straight through its central area in the thickness direction of the cage 11. A rotary shaft, not shown, is inserted through the through bore 22.

The cage 11 includes a pair of annular portions 23, 24 with different diameters, and a plurality of pillars 25 formed at intervals in the circumferential direction so as to form the pockets 21 that accommodate the needle rollers 13 therein and connecting the pair of annular portions 23, 24.

The pockets 21 are substantially rectangular as viewed in the axial direction. The pockets 21 are arranged radially about the rotation axis 12 of the cage 11. The pockets 21 have upper roller stoppers 26 and lower roller stoppers 27, 28 on their side wall surfaces. The upper roller stoppers 26 prevent the needle rollers 13 accommodated in the pockets 21 from falling out upward in the axial direction, while the lower roller stoppers 27, 28 prevent the needle rollers 13 accommodated in the pockets 21 from falling out downward in the axial direction. The upper roller stoppers 26 are formed in the middle parts in the radial direction of the pockets 21. The lower roller stoppers 27 are formed in the radially inner parts of the pockets 21, and the lower roller stoppers 28 are formed in the radially outer parts of the pockets 21. The upper roller stoppers 26 and the lower roller stoppers 27, 28 are formed on the side wall surfaces located on both sides in the circumferential direction of each pocket 21 so as to project into the pockets 21.

The needle rollers 13 are pressed into the pockets 21 to fit in the pockets 21. End faces of each needle roller 13, specifically, an outer end face 16 in the bearing and an inner end face 17 in the bearing, are flat.

The cage 11 has concave and convex portions that are formed by bending a plate in the thickness direction thereof a few times. Specifically, the cage 11 includes four disc portions 31, 32, 33, 34 extending in the radial direction and four cylindrical portions 36, 37, 38, 39 extending in the axial direction. The four disc portions 31 to 34 are arranged in this order from the inside in the radial direction so that the first disc portion 31 has the smallest inside diameter, followed by the second disc portion 32, the third disc portion 33, and the fourth disc portion 34 in ascending order. The four cylindrical portions 36 to 39 are arranged in order of the first cylindrical portion 36, the second cylindrical portion 37, the third cylindrical portion 38, and the fourth cylindrical portion 39 from the inside in the radial direction. The first cylindrical portion 36 and the second cylindrical portion 37 extend straight in the axial direction. The third cylindrical portion 38 is slightly tilted so that its radially inner part is located below its radially outer part in the axial direction. The fourth cylindrical portion 39, which is the outermost cylindrical portion in the radial direction, is slightly tilted so that its radially inner part is located above its radially outer part in the axial direction. The upper roller stoppers 26 are formed in the third disc portion 33. The lower roller stoppers 27 are formed in the second disc portion 32, and the lower roller stoppers 28 are formed in the fourth disc portion 34. The inner annular portion 23 in the radial direction includes the first disc portion 31, a part of the second disc portion 32, the first cylindrical portion 36, and the second cylindrical portion 37. The outer annular portion 24 in the radial direction includes a part of the fourth disc portion 34, a radially outer area bent portion 41, and projecting portions 44. The radially outer area bent portion 41 and the projecting portions 44 will be described later. Each pillar 25 includes a part of the second disc portion 32, the third disc portion 33, a part of the fourth disc portion 34, the third cylindrical portion 38, and the fourth cylindrical portion 39.

The cage 11 includes the radially outer area bent portion 41 that is formed by bending a radially outer area of the cage 11 inward in the radial direction. In other words, the cage 11 has the radially outer area bent portion 41 that is formed by bending an area located radially outside the pockets 21 inward in the radial direction. The radially outer area bent portion 41 is a standing wall standing in the axial direction. The radially outer area bent portion 41 is formed to extend continuously in an annular shape.

The radially outer area bent portion 41 of the present embodiment is formed by bending the area located radially outside the pockets 21 obliquely inward in the radial direction. Specifically, the radially outer area bent portion 41 is formed by bending the radially outer edge of the fourth disc portion 34, which is the outermost disc portion in the radial direction, upward in the axial direction to a predetermined angle.

The angle of the radially outer area bent portion 41, namely the angle between a radially inner surface 42 of the radially outer area bent portion 41 and an upper surface 43 of the fourth disc portion 34, is shown by an angle $B_1$ in FIGS. 2 and 3. This angle may be 0°, but is preferably an acute angle.

The radially outer area bent portion 41 has the projecting portions 44 formed in its tip end at positions aligned with the pockets 21. That is, the projecting portions 44 are formed at positions aligned with the pockets 21 and face inward in the radial direction. The positions aligned with the pockets 21 are such positions that the outer peripheral edges of the projecting portions 44 overlap the outer peripheral edges of the pockets 21. That is, the radially inner edge of the radially outer area bent portion 41 overlaps the radially outer edges of the pockets 21.

The projecting portions 44 project inward in the radial direction beyond the radially outer edges of the pockets 21 so as to contact the end faces 16 of the rollers 13 accommodated in the pockets 21. Namely, the projecting portions 44 abut on the end faces of the rollers accommodated in the pockets 21 to restrict movement of the rollers toward the outside in the radial direction. Specifically, the projecting portions 44 are shaped to extend continuously from the inner peripheral edge of the radially outer area bent portion 41 toward the inside in the radial direction. That is, the radially outer area bent portion 41 and the projecting portions 44 are formed as a single-piece member.

The projecting portions 44 are formed at circumferential positions so that the tips of the projecting portions 44 are located in the middle parts in the circumferential direction of the pockets 21. Specifically, the projecting portions 44 are formed so that their corners 45 on the surface 42 side, namely the innermost parts in the radial direction of the projecting portions 44 (the innermost corners 45 in the radial direction of the projecting portions 44) contact the centers of the end faces 16 of the needle rollers 13 accommodated in the pockets 21. In this example, the corners 45 are the corners of the projecting portions 44 which are located closer to the fourth disc portion 34.

The shape of the projecting portions 44 will be described with reference to FIG. 4. As shown in FIG. 4, the width L of the projecting portion 44 is ⅓ or more and ⅔ or less of the width X of the pocket 21. The width X of the pocket 21 is the circumferential length of the pocket 21 and is the width of the space where the roller stoppers 26 to 28 are not formed. The width L of the projecting portion 44 is the width of the widest part of the projecting portion 44, and in FIG. 4, is the width at the base end part of the projecting portion 44. In the case where the projecting portion 44 has an arc shape as viewed in plan, the width L of the projecting portion 44 is the distance between both ends of the projecting portion 44, namely a chord connecting these ends on the arc. In the case where the projecting portion 44 has an arc shape as viewed in plan, the radius R of the arc of the projecting portion 44 is 0.4 mm or more and 0.7 mm or less, and preferably 0.5 mm or more and 0.6 mm or less. In the case where the projecting portion 44 is a part of a circle as viewed in plan, the radius R is the radius of the circle.

As shown in FIGS. 1 and 2, the cage 11 has three pilot holes 51, 52. The three pilot holes 51, 52 serve as engagement portions for alignment. One of the pilot holes is not shown in FIG. 1. The three pilot holes 51, 52 are formed at intervals in the circumferential direction and extend straight through the cage 11 in the thickness direction of the cage 11. The three pilot holes 51, 52 open in a circular shape. The three pilot holes 51, 52 are formed substantially equally spaced apart from each other. In this example, the three pilot holes 51, 52 are formed at intervals of 120 degrees about the rotation axis 12 of the cage 11. Specifically, the pilot holes 51, 52 are formed in the middle part in the radial direction of the innermost first disc portion 31 in the radial direction. For example, the diameter of the pilot holes 51, 52 is φ2.5 mm or φ3 mm.

For example, the thrust roller bearing 20 having such a cage 11 includes the plurality of needle rollers 13, the upper bearing ring 14, and the lower bearing ring 15. When the thrust roller bearing 20 is in operation, the needle rollers 13 accommodated in the pockets 21 roll on a raceway surface 18 of the upper bearing ring 14 in the axial direction and a raceway surface 19 of the lower bearing ring 15 in the axial direction. The cage 11 rotates around its rotation axis 12. Each of the needle rollers 13 accommodated in the pockets 21 revolves while rotating around its axis. The needle rollers 13 are subjected to a radially outward centrifugal force. The centers of the end faces 16 of the needle rollers 13 make sliding contact with the projecting portions 44 of the cage 11, specifically the innermost corners 45 in the radial direction of the projecting portions 44 of the cage 11. That is, the corners 45 of the projecting portions 44 are the areas that contact the end faces 16 of the needle rollers 13.

The corners 45 have been press-flattened. The corners 45 subjected to the press-flattening process have no sharply pointed parts and smoothly connect to the surfaces forming the corners 45. This reduces aggression of the corners 45 against members that are contacted by the corners 45.

Figure 5:
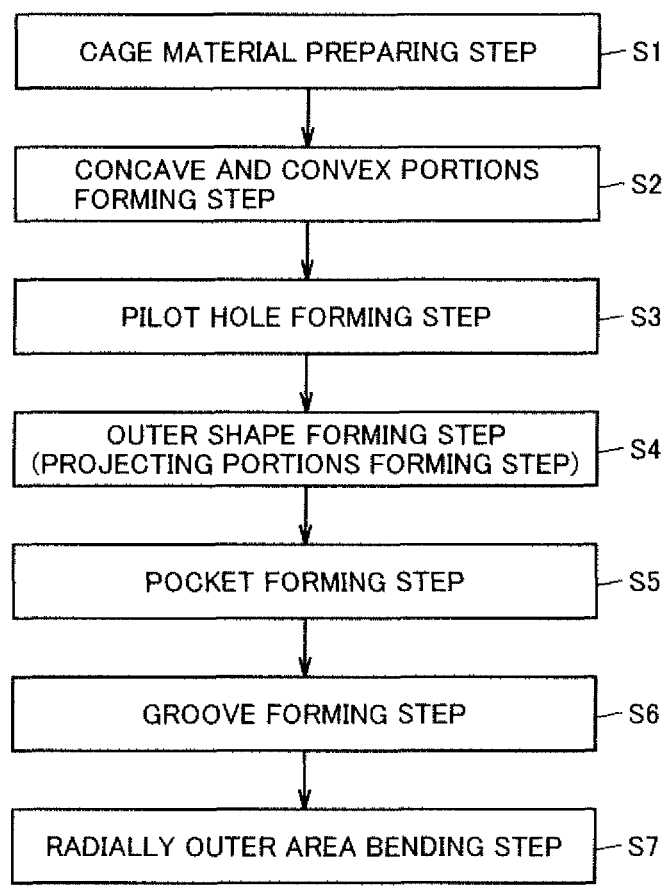
FIG. 5 is a flowchart illustrating representative steps of a method for manufacturing the thrust roller bearing cage according to the embodiment of the present invention.

Next, a method for manufacturing the thrust roller bearing cage 11 according to the embodiment of the present invention will be described. The thrust roller bearing cage 11 is manufactured by using a transfer press. The transfer press is a relatively inexpensive press machine with a less complicated configuration. FIG. 5 is a flowchart illustrating representative steps of the method for manufacturing the thrust roller bearing cage 11 according to the embodiment of the present invention.

Referring to FIG. 5, a cage material, which will later become the cage 11, is first prepared (cage material preparing step: step S1). For example, the cage material is a thin flat steel sheet. At this stage, the cage material may be either a plate cut into a substantially rectangular shape or a circular plate, as the final outer shape of the cage is formed in an outer shape forming step (step S4) that will be performed later.

Next, concave and convex portions are formed in the cage material in the thickness direction of the cage material (concave and convex portions forming step: step S2). This ensures that the cage 11 has a large length dimension in the direction of its rotation axis even if the cage 11 is in the shape of a thin plate, whereby the cage 11 can appropriately retain the rollers.

Figure 6:
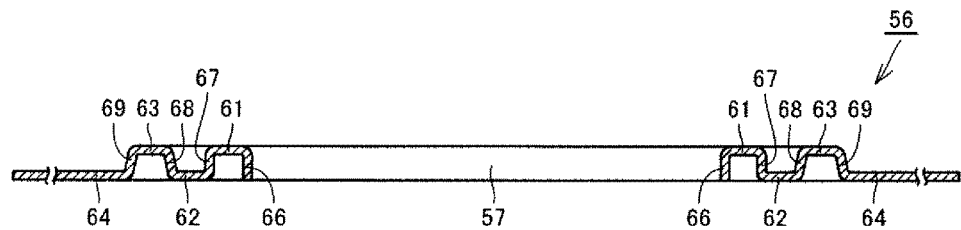
FIG. 6 is a sectional view of a cage material after a concave and convex portions forming step.

Specifically, in this step, the cage material is subjected to a drawing process. In this case, the concave and convex portions can thus be formed more efficiently. FIG. 6 is a sectional view of the cage material after the concave and convex portions forming step. The section shown in FIG. 6 corresponds to the section shown in FIG. 2. Specifically, referring to FIG. 5, a flat plate-like cage material 56 is subjected to a drawing process to form first to fourth disc portions 61 to 64 and first to fourth cylindrical portions 66 to 69. A circular through bore 57 is formed in the central part of the cage material 56 so as to extend therethrough in the thickness direction. That is, in this case, the cage material 56 has what is called a mountain-and-valley shape made by bending the cage material 56 a plurality of times in the axial direction.

Figure 7:
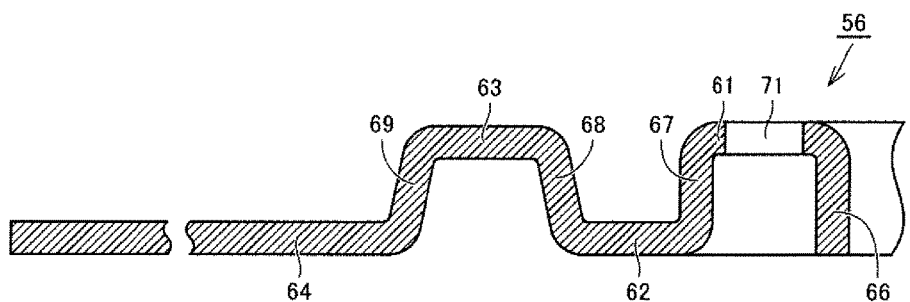
FIG. 7 is an enlarged sectional view showing a part of the cage material after a pilot hole forming step.

Thereafter, pilot holes serving as engagement portions are formed (pilot hole forming step: step S3). FIG. 7 is an enlarged sectional view showing a part of the cage material 56 after the pilot hole forming step. The section shown in FIG. 7 corresponds to the area VII in FIG. 2. A pilot hole 71 serving as an engagement portion is formed in the middle part in the radial direction of the first disc portion 61 so as to extend straight through the first disc portion 61 in the thickness direction. Three of the pilot holes 71 are formed in total so as to be substantially equally spaced apart from each other at intervals of 120 degrees in the circumferential direction.

Subsequently, the outer shape of the cage material 56 is formed (outer shape forming step: step S4). In this step, the outer shape including portions that will later become projecting portions is formed so that the portions have a width of ⅓ or more and ⅔ or less of the width of pockets to be formed in a pocket forming step (step S5) that will be performed later, and so that the portions have an arc shape with a radius of 0.4 mm or more and 0.7 mm or less, and preferably 0.5 mm or more and 0.6 mm or less, as viewed in plan.

Figure 8:
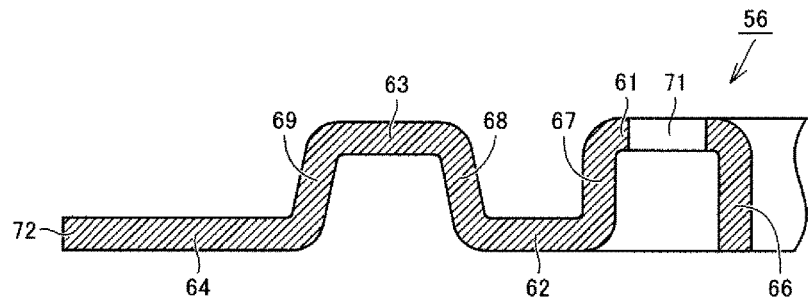
FIG. 8 is an enlarged sectional view showing a part of the cage material after an outer shape forming step.

FIG. 8 is an enlarged sectional view showing a part of the cage material 56 after the outer shape forming step. The section shown in FIG. 8 corresponds to the area VII shown in FIG. 2, and is a section taken along line VIII-VIII in FIG. 9. Specifically, in this example, the cage material 56 is punched straight in the thickness direction so that the cage 11 can be formed into the final outer shape by a radially outer area bending step (step S7) etc. that will be performed later. In this case, the outer shape of the cage material 56 can be formed relatively easily and accurately. A radially outer edge 72 of the cage 11, specifically, a radially outer edge 72 of the fourth disc portion 64, is thus formed.

Figure 9:
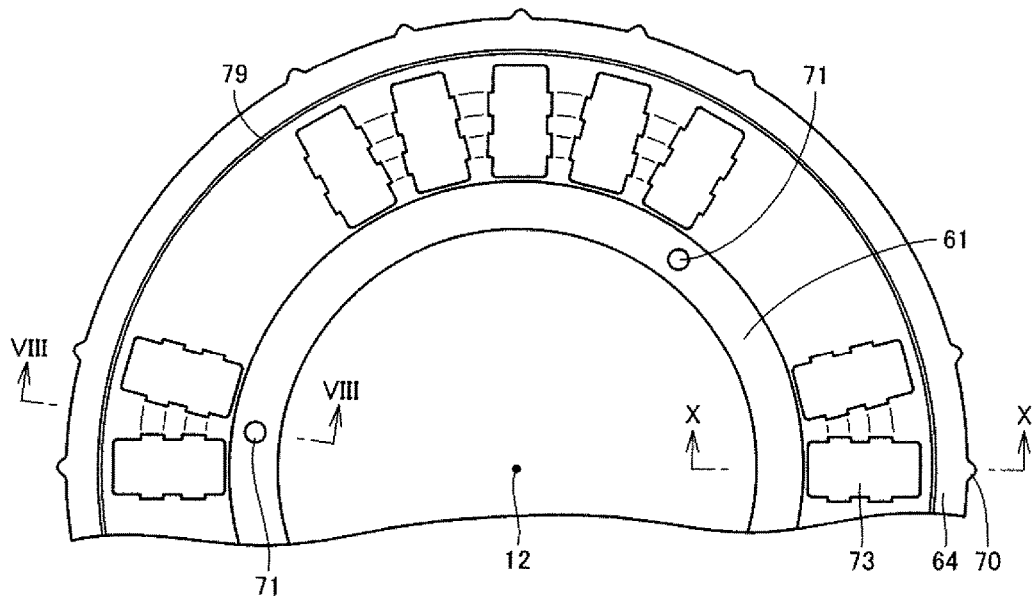
FIG. 9 shows a part of the cage material after a pocket forming step.

When forming the outer shape, the cage material 56 is punched so as to form the portions that will later become projecting portions 70. That is, in this case, the outer shape forming step is also a projecting portions forming step, i.e., the step of forming the projecting portions. FIG. 9 shows a part of the cage material 56 after a pocket forming step, which is the step following the outer shape forming step. FIG. 9 corresponds to FIG. 1. When punching the cage material 56 so as to form the projecting portions 70, the cage material 56 is aligned in the circumferential direction by using the plurality of pilot holes 71. Specifically, a plurality of guide pins (not shown), which serve as what is called pencil-like alignment jigs having a pointed end and having a tapered shape with its diameter gradually increasing from the pointed end, are prepared and are gradually inserted into the plurality of pilot holes 71 from one side in the thickness direction. The cage material 56 is thus aligned by using the plurality of guide pins and is punched into the overall outer shape with a punching machine (not shown) in view of the positions, the shape, etc. of the projecting portions 70. Accordingly, even if the cage material 56 is slightly out of alignment with the punching machine with respect to the proper positions where the projecting portions 70 are supposed to be formed, the cage material 56 can be aligned with the punching machine with respect to the proper positions where the projecting portions 70 are supposed to be formed, as the pencil-like guide pins having a pointed end are gradually inserted into the pilot holes 71. The punching process can thus be performed. In this example, since the cage material 56 has the three pilot holes 71, rotation etc. of the cage material 56 is prevented during alignment. The cage material 56 can thus be aligned more accurately.

Figure 10:
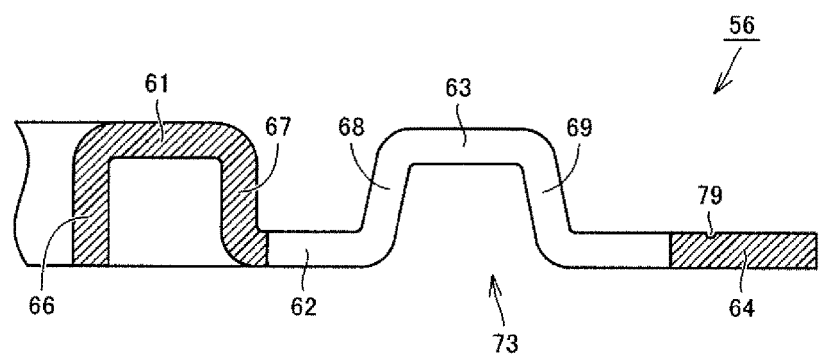
FIG. 10 is an enlarged sectional view showing a part of the cage material after the pocket forming step.

Subsequently, pockets are formed (pocket forming step: step S5). FIG. 10 is an enlarged sectional view showing a part of the cage material after the pocket forming step. The section shown in FIG. 10 corresponds to the area III shown in FIG. 2 and is a section taken along line X-X in FIG. 9. In this example, each pocket 73 is punched out along a part of the second disc portion 62, the third disc portion 63, and a part of the fourth disc portion 64 and also along the third cylindrical portion 68 and the fourth cylindrical portion 69 so as to extend straight through the cage material 56 in the thickness direction. Although not shown in FIG. 10, the upper roller stoppers and the lower roller stoppers, which are shaped so as to project into the pockets 73 in the circumferential direction, are formed simultaneously with the pockets 73. That is, the pockets 73 are punched out in view of the shape of the upper roller stoppers and the lower roller stoppers so as to conform to the outer shape of needle rollers 13 that are to be accommodated in the pockets 73. The plurality of pockets 73 may be punched out either all at once or one by one.

When forming the pockets 73 in the cage material 56, the pilot holes 71 are also used to align the cage material 56 to be punched with a punching machine (not shown) for punching out the pockets. That is, the pockets 73 are formed with respect to the positions of the pilot holes 71. As in the case of the outer shape forming step, alignment in the circumferential direction is performed by using the plurality of pilot holes 71. Specifically, a plurality of guide pins serving as sharp pencil-like alignment jigs are prepared and the tip ends of the guide pins are gradually inserted into the plurality of pilot holes 71 from one side in the thickness direction as described above. The cage material 56 is thus aligned by using the plurality of guide pins, and the pockets 73 are punched out with the punching machine in view of the positions, shape, etc. of the pockets 73. The pockets 73 are thus formed in phase with the projecting portions 70 in the circumferential direction, so that an appropriate positional relationship can be established between the pockets 73 and the projecting portions 70. Accordingly, the projecting portions 70 can be accurately and efficiently formed in terms of the positional relationship of the projecting portions 70 with the pockets 73 to be formed. Since the projecting portions 44 are accurately formed at the appropriate positions, end faces 16 of the needle rollers 13 can appropriately contact the projecting portions 44 when the bearing is in operation. The plurality of pockets 73 may be punched out either all at once or one by one.

In the present embodiment, the pilot holes 71 are formed in an area located radially inside the pockets 73. In this case, the pilot holes 71 can be formed by making effective use of the available area of the cage 11.

In the present embodiment, the pilot holes 71 are formed so as not to overlap the pockets 73 in the circumferential direction. This can avoid local strength reduction in the circumferential direction of the cage 11. The positional relationship of the pockets 73 with the pilot holes 71 can be determined as desired. Specifically, in this example, the plurality of pockets 73 are formed so that each of the pilot holes 71 is located at a position corresponding to the middle in the circumferential direction between adjoining ones of the pockets 73.

Subsequently, as shown in FIGS. 9 and 10, an annular groove 79 is formed at a position radially outside the pockets 73 in the cage material (groove forming step: step S6). In this step (step S6), the groove 79 is formed at such a position that the cage material is to be bent along the groove 79 when forming a radially outer area bent portion 41 in the radially outer area bending step (step S7) which will be described below. Although performing the groove forming step (step S6) makes it easier to bend a radially outer area of the cage material 56 inward in the radially outer area bending step (step S7) described below, the groove forming step (step S6) may be omitted. The steps S4 to S6 may be performed in any order.

Subsequently, an area of the cage material 56 which is located radially outside the pockets 73 is bent inward in the radial direction to form a radially outer area bent portion (radially outer area bending step) (step S7). In this step, it is preferable to bend this area of the cage material 56 obliquely inward in the radial direction to an acute tilt angle to form the radially outer area bent portion. In the case where the groove forming step (step S6) is performed, a radially outer area of the cage material 56 is bent along the groove 79 to form the radially outer area bent portion.

Figure 11:
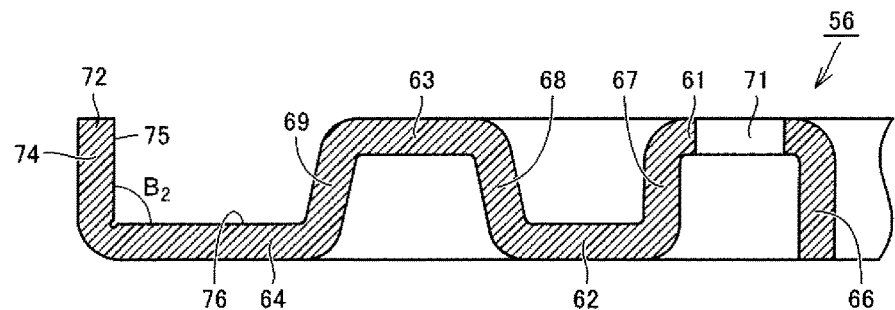
FIG. 11 is an enlarged sectional view showing a part of the cage material during a radially outer area bending step.
Figure 12:
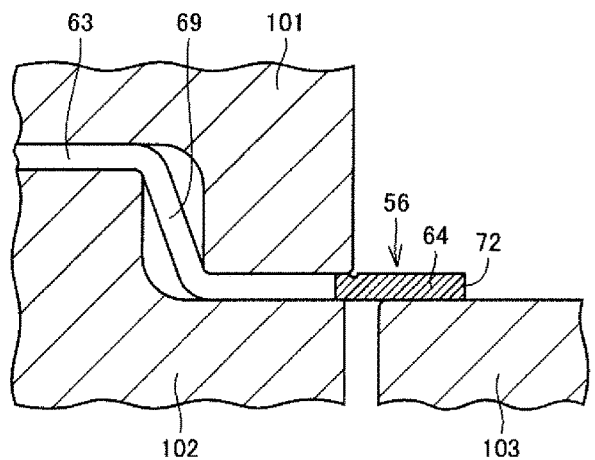
FIG. 12 is an enlarged sectional view illustrating how the radially outer area bending step is performed.
Figure 13:
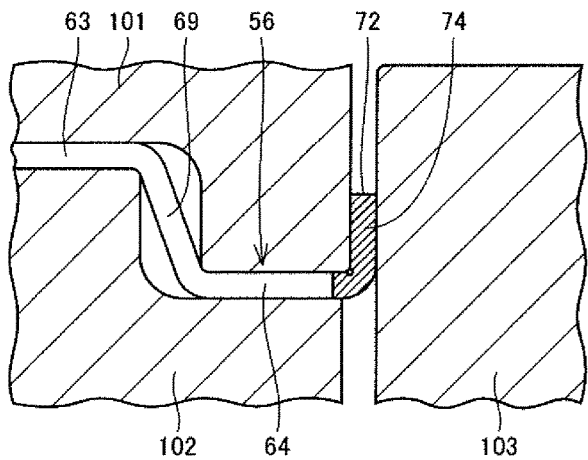
FIG. 13 is an enlarged sectional view illustrating how the radially outer area bending step is performed.
Figure 14:
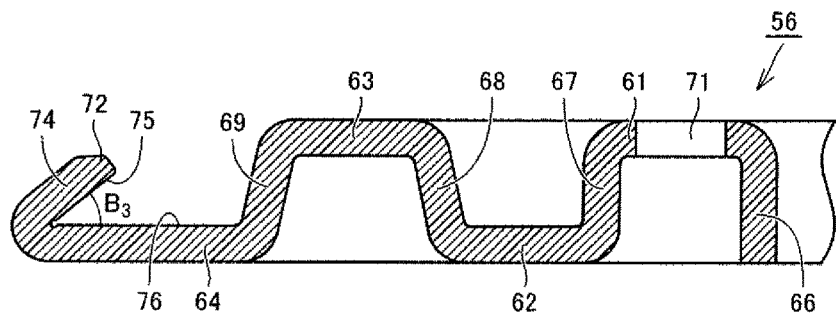
FIG. 14 is an enlarged sectional view showing a part of the cage material after the radially outer area bending step.
Figure 15:
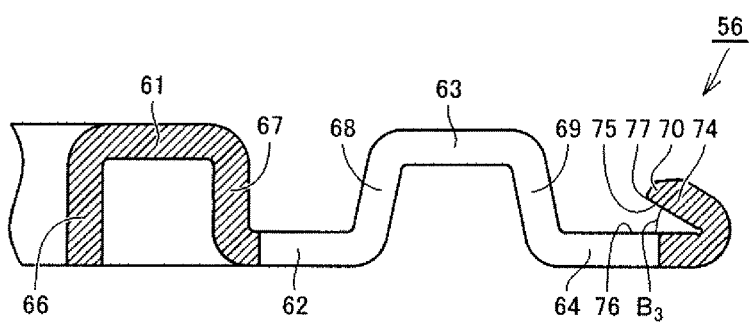
FIG. 15 is an enlarged sectional view showing a part of the cage material after the radially outer area bending step.

FIG. 11 is an enlarged sectional view showing a part of the cage material during the radially outer area bending step. FIGS. 12 and 13 are enlarged sectional views illustrating how the radially outer area bending step is performed. FIGS. 14 and 15 are enlarged sectional views showing a part of the cage material 56 after the radially outer area bending step. The sections shown in FIGS. 11 and 14 correspond to the area VII in FIG. 2. The section shown in FIG. 15 corresponds to the area III in FIG. 2. The sections shown in FIGS. 12 and 13 show the positional relationship of an area of the cage material 56 which is located radially outside the position corresponding to the area VII in FIG. 2 with holding members 101, 102 and a pressing member 103. In this example, as shown in FIG. 11, the annular radially outer edge 72 of the cage material 56 is first bent along the entire circumference so as to extend straight in the thickness direction. That is, the angle $B_2$ between a radially inner surface 75 of a radially outer area bent portion 74 and an upper surface 76 of the fourth disc portion 64 is approximately a right angle. For example, the radially outer edge 72 is bent to a right angle by the following method, although the present invention is not particularly limited to this method. As shown in FIG. 12, the entire cage material 56 except for a radially outer area of the fourth disc portion 64 is sandwiched between the holding members 101, 102 in the vertical direction and is held therebetween, and the pressing member 103 is placed under the radially outer area of the fourth disc portion 64. As shown in FIG. 13, the pressing member 103 is then moved upward. The radially outer area bent portion 74 can thus be formed at a right angle with respect to the fourth disc portion 64.

Subsequently, as shown in FIGS. 14 and 15, the radially outer area bent portion 74 is tilted further inward in the radial direction, whereby the radially outer area bent portion 74 is formed. The bending angle (tilt angle), that is, the angle between the radially inner surface 75 of the radially outer area bent portion 74 and the upper surface 75 of the fourth disc portion 64 is shown by an angle $B_3$ in FIGS. 14 and 15. The angle $B_3$ corresponds to the angle $B_1$ described above. In other words, the angle $B_1$ is equal to the angle $B_3$. It is preferable that the angles $B_1$, $B_3$ be acute angles.

In this example, in terms of the positional relationship in the circumferential direction, the projecting portions 70 are formed at the positions corresponding to the middle parts in the circumferential direction of the pockets 73. The projecting portions 70 are thus formed at appropriate positions. Specifically, the projecting portions 70 abut on the centers of the end faces 16 of the needle rollers 13 at their corners 77 located closer to the fourth disc portion 64. As shown in FIG. 4, the projecting portions 70 are formed so that the width L of the projecting portions is 1.3 or more and ⅔ or less of the width of the pockets, and preferably, the radius of the arc of the projecting portions is 0.4 mm or more and 0.7 mm or less. Finally, the areas of the projecting portions 70 which are to contact the end faces 16 of the needle rollers 13 are subjected to a press-flattening process. The thrust roller bearing cage 11 configured as shown in FIGS. 1 to 4 is thus manufactured.

Figure 16:
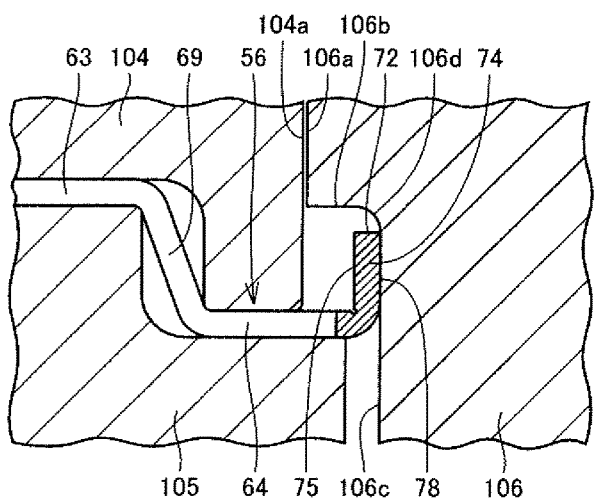
FIG. 16 is an enlarged sectional view illustrating how the radially outer area bending step is performed.
Figure 17:
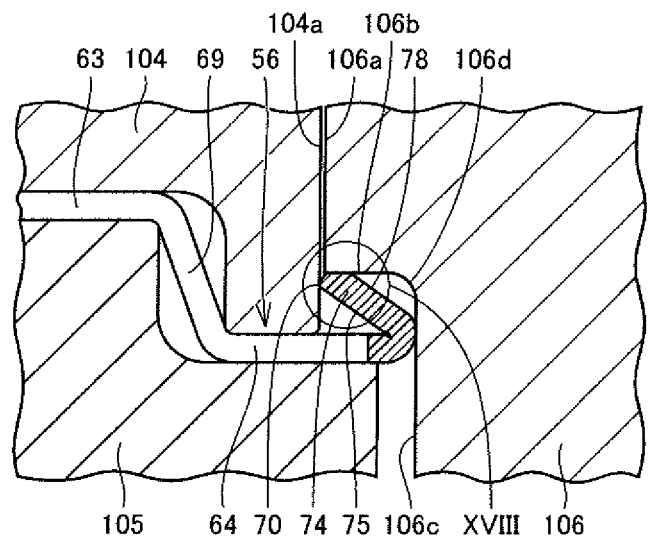
FIG. 17 is an enlarged sectional view illustrating how a press-flattening step is performed.
Figure 18:
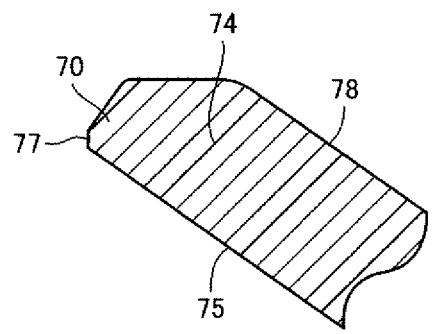
FIG. 18 is an enlarged sectional view showing the tip of a radially outer area bent portion after the press-flattening step.

The step of tilting the radially outer edge 72 of the cage material 56 inward in the radial direction after the annular radially outer edge 72 is bent so as to extend straight in the thickness direction and the press-flattening process may be performed successively. FIG. 16 is an enlarged sectional view illustrating how the radially outer area bending step is performed. FIG. 17 is an enlarged sectional view illustrating how the press-flattening step is performed. FIG. 18 is an enlarged sectional view showing the tip of the radially outer area bent portion after the press-flattening step. Specifically, as shown in FIG. 16, after the cage material 56 is bent so that the radially outer area bent portion 74 extends at a right angle with respect to the fourth disc portion 64, an area of the cage material 56 which is located radially inside the radially outer area bent portion 74 is sandwiched between dies 104, 105 in the vertical direction and is held therebetween. At this time, the radially outer edge of the upper die 104 is located radially inside the radially outer edge of the lower die 105. A die 106 that presses the radially outer area bent portion 74 downward from above is also placed so as to contact a radially outer surface 78 of the radially outer area bent portion 74. The die 106 includes a radially inner end face 106a that faces the upper die 104 and extends in the vertical direction, a horizontal face 106b that is continuous with the radially inner end face 106a and extends outward in the radial direction, and a radially inner face 106c that faces the radially outer surface 78 of the radially outer area bent portion 74 and extends in the vertical direction. A part 106d of the die 106 where the horizontal face 106b and the radially inner face 106c meet has a round (R) shape. When the die 106 is moved downward so that the radially inner end face 106a moves along a radially outer end face 104a of the die 104, the radially outer area bent portion 74 can be tilted inward in the radial direction as guided by the round part 106d. Subsequently, as shown in FIG. 17, the die 104 is moved further downward so that the radially inner corner of the radially outer area bent portion 74 is smoothed by the radially outer end face 104a of the die 104 and the radially outer corner of the radially outer area bent portion 74 is smoothed by the horizontal face 106b of the die 106. As shown in FIG. 18, the projecting portions 70 subjected to the press-flattening process in the areas of the projecting portions 70 which are to contact the end faces of the rollers can be formed in this manner.

Figure 19:
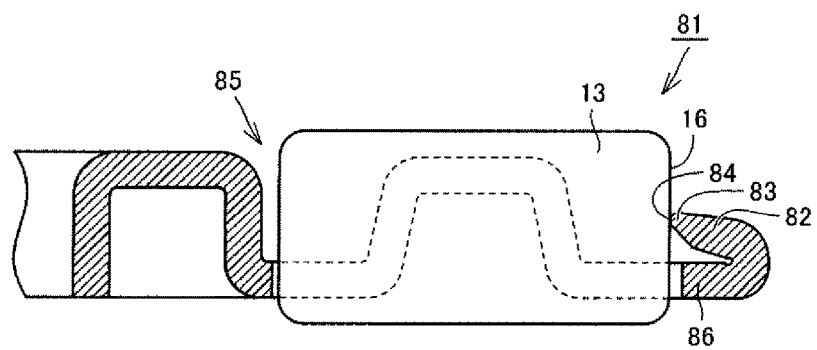
FIG. 19 is a sectional view showing a part of a thrust roller bearing cage according to another embodiment of the present invention.

In the above embodiment, the corners of the projecting portions which are located closer to the fourth disc portion contact the centers of the end faces of the needle rollers accommodated in the pockets. However, the present invention may have the following configuration. FIG. 19 is a sectional view showing a part of a cage having this configuration. FIG. 19 corresponds to the section shown in FIG. 3.

Referring to FIG. 19, a thrust roller bearing cage 81 according to another embodiment of the present invention has a radially outer area bent portion 82 having projecting portions 83 formed at positions corresponding to the positions of pockets 85. The projecting portions 83 contact the centers of end faces 16 of needle rollers 13 accommodated in the pockets 85 at corners 84 located on the opposite side of the projecting portions 83 from a fourth disc portion 86. The corners 84 have been press-flattened. This configuration can be achieved by machining the corners 84 with a jig angled so as to conform to the corner 84 in the radially outer area bending step.

Figure 20:
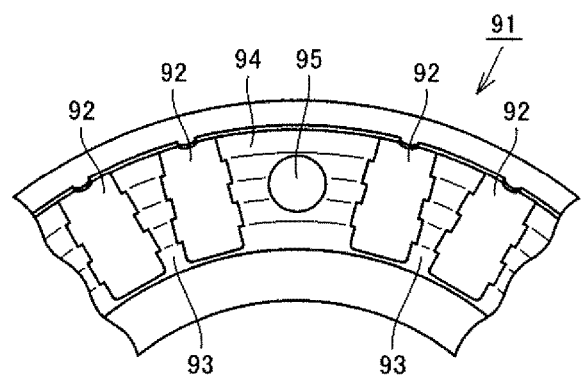
FIG. 20 shows a part of a thrust roller bearing cage according to still another embodiment of the present invention.

A pilot hole may be formed at a position where a pocket is supposed to be formed. In other words, one of the plurality of pockets may be used as a pilot hole. FIG. 20 shows a part of a cage having this configuration. Referring to FIG. 20, a thrust roller bearing cage 91 according to still another embodiment of the present invention includes a plurality of pockets 92 and pillars 93 each located between adjoining two of the pockets 92. A pilot hole 95 is formed at a position where a pocket 92 is supposed to be formed in a pillar 94 located between the pockets 92. In this configuration, one of the plurality of pockets 92 that are formed equally spaced apart from each other in the circumferential direction is replaced with this pilot hole 95.

In the above embodiment, the pilot holes extend straight through the cage in the thickness direction. However, the present invention is not limited to this. For example, the pilot holes extending through the cage may have a tapered wall surface. The pilot holes are not limited to the circular holes and may be quadrilateral holes, triangular holes, etc. The pilot holes are formed as engagement portions. However, the present invention is not limited to this. The engagement portions may have other configurations. For example, the engagement portions may be formed by cutouts.

In the above embodiment, a drawing process is performed in the concave and convex portions forming step. However, the present invention is not limited to this. A process other than the drawing process, such as a bending process, may be used to form concave and convex portions.

In the above embodiment, the cage has the concave and convex portions that are formed in the thickness direction. However, the present invention is not limited to this. The cage may not have the concave and convex portions that are formed in the thickness direction, and a cage in the form of what is called a laminate of two plates may be used.

In the above embodiment, the thrust roller bearing having such a cage as described above may not have bearing rings. Rollers other than the needle rollers, such as long rollers etc., may be used.

Advantageous effects of the thrust roller bearing cage of the present embodiment and the method for manufacturing the same will be described below. As shown in Table 1 below, the inventors found out the following regarding the flow of lubricant and strength for various widths of the projecting portions.

roller being in contact with the projecting portion is large enough for lubricant to flow therethrough. The lubricant therefore easily flows in the thrust roller bearing. Specifically, in Examples 1 to 3 in which the width L of the projecting portions is ⅓ or more and ⅔ or less of the width X of the pockets, the projecting portion located in the middle is less likely to block the flow of lubricant when it flows upward (in the axial direction) through a radially outer area of the pocket. The lubricant can therefore flow upward through the radially outer area of each pocket and can further flow in the circumferential direction. A satisfactory flow of lubricant can thus be achieved. On the other hand, in Comparative Example 2 in which the width L of the projecting portions is ¾ of the width X of the pockets, the projecting portion disrupts the flow of lubricant when it flows upward through the radially outer area of the pocket. Accordingly, a satisfactory flow of lubricant cannot be achieved. In Comparative Example 1 in which the width L of the projecting portions is the same as the width X of the pockets, the lubricant does not flow upward through the radially outer area of the pocket due to the projecting portion.

As shown in Table 1, in Examples 1 to 3 in which the width L of the projecting portions is ⅓ or more and ⅔ or less of the width X of the pockets, when the projecting portions are subjected to a rotational centrifugal force of the rollers (a force applied from the inside toward the outside in the radial direction), the projecting portions can withstand the load from the rollers and the shape of the projecting portions tends to be maintained. The projecting portions therefore have high strength. On the other hand, in Comparative Example 3 in which the width L of the projecting portions is ¼ of the width X of the pockets, the projecting portions

TABLE 1

|  | Comparative Example 1 | Comparative Example 2 | Example 1 | Example 2 | Example 3 | Comparative Example 3 |
|---|---|---|---|---|---|---|
| Width L | X | (3/4)X | (2/3)X | (1/2)X | (1/3)X | (1/4)X |
| Flow of Lubricant | X | Δ | ○ | ○ | ⊚ | ⊚ |
| Strength | ○ | ○ | ○ | ○ | ○ | X |

In Table 1, the "width L" refers to the width L of the projecting portion 44 shown in FIG. 4 and is expressed as a ratio to the width X of the pocket 21.

The "flow of lubricant" refers to the flow of lubricant in the case of using a thrust roller bearing accommodating rollers in pockets of a cage. In the table, "⊚" means that the flow of lubricant is highly satisfactory, "○" means that the flow of lubricant is satisfactory, "Δ" means that the flow of lubricant is not satisfactory, and "x" means that the flow of lubricant is poor. That is, "⊚" means the most satisfactory flow of lubricant, followed by "○," "Δ," and "x" in descending order.

The "strength" refers to the strength of projecting portions in the case of using a thrust roller bearing accommodating rollers in pockets of a cage. In the table, "○" means that the projecting portions can be maintained when the thrust roller bearing is used, and "x" means that the projecting portions cannot be maintained when the thrust roller bearing is used. That is, "○" means the highest strength, followed by "x."

As shown in Table 1, in Examples 1 to 3 in which the width of the projecting portions is ⅓ or more and ⅔ or less of the width of the pockets, clearance that is formed in each pocket by the roller, the radially outer area bent portion, and the projecting portion with the radially outer end face of the tend to be deformed when subjected to the load from the rollers. The projecting portions therefore have low strength.

Accordingly, the thrust roller bearing cage of the present embodiment and the method for manufacturing the same can achieve improved strength and a satisfactory flow of lubricant since the width L of the projecting portions is ⅓ or more and ⅔ or less of the width X of the pockets.

In addition, in the case where the projecting portions are formed by bending the radially outer area of the cage obliquely inward in the radial direction and the areas of the projecting portions which are to contact the end faces of the rollers are subjected to a press-flattening process, the following advantageous effects are further provided by setting the width L of the projecting portions to ⅓ or more and ⅔ or less of the width X of the pockets. In the case where the radially outer area bent portion is formed by bending the area located radially outside the pockets inward in the radial direction to a desired tilt angle, the projecting portions have a smaller contact area with the rollers than in the case where the tilt angle is 0° (Comparative Example 1) as in Patent Literature 1. Specifically, in Patent Literature 1 in which the tilt angle is 0°, the entire tip end faces of the projecting portions contact the central parts of the end faces of the rollers accommodated in the pockets. On the other hand, in the present embodiment, the innermost corners in the radial direction of the tip end faces of the projecting portions contact the centers of the end faces of the rollers accommodated in the pockets. This contact is close to point contact rather than surface contact. When the rollers are biased from the central axis of the cage toward the outside in the radial direction by the rotational centrifugal force of the rollers, friction is generated between each roller and the part of each projecting portion which contacts the roller. Accordingly, the projecting portions of the present embodiment having a smaller contact area with the rollers can reduce rotational resistance, whereby running torque can be reduced. The radially outer area bending step (step S7) and the press-flattening step are performed in order to form such projecting portions. In the case where the width L of the projecting portions is ⅓ or more of the width X of the pockets, the projecting portions are less likely to be deformed in these steps and collapse of the projecting portions can be prevented. Specifically, for example, in the radially outer area bending step (step S7) and the press-flattening step, a pressing process is performed in a manner described above. Setting the width L of the projecting portions to ⅓ or more of the width X of the pockets can prevent deformation and collapse of the projecting portions in the pressing process.

As shown in Table 2 below, the inventors found out the following regarding running torque after long term use, the shape upon machining, and strength for various radii of the arc of the projecting portions in the case where the projecting portions have an arc shape as viewed in plan. In Table 2, the width of the projecting portions is ½ of the width of the pockets.

TABLE 2

|  | Example 4 | Example 5 | Example 2 | Example 6 | Example 7 | Example 8 |
|---|---|---|---|---|---|---|
| Radius R (mm) | 0.3 | 0.4 | 0.5 | 0.6 | 0.7 | 0.8 |
| Torque after Long Term Use | ○ | ○ | ○ | ○ | ○ | X |
| Shape upon Machining | X | ○ | ○ | ○ | ○ | ○ |
| Strength | Δ | ○ | ○ | ○ | ○ | ○ |

In Table 2, the "radius R" refers to the radius of the arc in the case where the projecting portions have an arc shape as viewed in plan, and is the radius R of the projecting portion 44 shown in FIG. 4.

The "torque after long term use" refers to running torque in the case where the thrust roller bearing accommodating the rollers in the pockets of the cage has been used for a long period of time. In the table, "○" means that the running torque after long term use shows little decrease from initial running torque, and "x" means that the running torque after long term use is significantly lower than the initial running torque. That is, "○" means the smallest decrease from the initial running torque, followed by "x."

The "shape upon machining" refers to the shape of the projecting portions after the radially outer area bending step (step S7). In the table, "○" means that the shape of the projecting portions were maintained even when subjected to the radially outer area bending step, and "x" means that the projecting portions were deformed when subjected to the radially outer area bending step.

The "strength" is similar to the strength in Table 1. In the table, "○" means that the projecting portions can be maintained when the thrust roller bearing is used, and "Δ" means that the projecting portions can be maintained when the thrust roller bearing is used, as long as the load from the rollers is moderate or lower, and means higher strength than "x" in Table 1. That is, in Tables 1 and 2, "○" means the highest strength, followed by "Δ" and "x" in descending order.

As shown in Table 2, in Examples 2, 4 to 7 in which the radius R of the arc of the projecting portions is 0.3 mm or more and 0.7 mm or less, even if the parts of the projecting portions which contact the rollers become worn after long term use of the thrust roller bearing, the area of the parts of the projecting portions which contact the rollers (the contact area of the worn projecting portions with the rollers) increases only slightly. A decrease in running torque can therefore be restrained. That is, if the projecting portions become worn after long term use of the cage, the contact area of the projecting portions with the rollers increases, but the rate of increase is low, and therefore a decrease in running torque after long term use can be restrained.

In Examples 2, 5 to 8 in which the radius R of the arc of the projecting portions is 0.4 mm or more and 0.8 mm or less, the projecting portions are not deformed when subjected to the radially outer area bending step (step S7). In Examples 2, 5 to 8 in which the radius R of the arc of the projecting portions is 0.4 mm or more and 0.8 mm or less, deformation of the projecting portions can be effectively restrained especially when the radially outer area bending step (step S7) and the press-flattening process shown in FIGS. 16 and 17 are successively performed for pressing.

When the width of the projecting portions is ⅓ or more and ⅔ or less of the width of the pockets, the projecting portions are strong enough to withstand the load of a moderate or higher level from the rollers, regardless of the radius R of the arc of the projecting portions. In Examples 2, 5 to 8 in which the radius R of the arc of the projecting portions is 0.4 mm or more and 0.8 mm or less, the projecting portions have even higher strength.

Accordingly, in Examples 2, 5 to 7 in which the radius R of the arc of the projecting portions is 0.4 mm or more and 0.7 mm or less, all of the torque after long term use, the shape upon machining, and the strength are evaluated as "○." That is, setting the width of the projecting portions to ⅓ or more and ⅔ or less of the width of the pockets and setting the radius of the arc of the projecting portions to 0.4 mm or more and 0.7 mm or less can achieve improved strength and a satisfactory flow of lubricant, can restrain a decrease in running torque after long term use, and allows the shape upon machining to be maintained.

The embodiments disclosed herein are by way of example in all respects and should not be interpreted as restrictive. The scope of the present invention is defined by the claims rather than by the above embodiments, and the invention is intended to cover all changes and modifications within the spirit and scope of the invention as defined by the claims.

INDUSTRIAL APPLICABILITY

The thrust roller bearing cage according to the present invention and the method for manufacturing the same are effectively utilized to meet demands for thrust roller bearing cages with excellent performance and more efficient methods for manufacturing such a thrust roller bearing cage.

REFERENCE SIGNS LIST 11, 81, 91 Cage
12 Rotation Axis
13 Roller
14, 15 Bearing Ring
16, 17 End Face
18, 19 Raceway Surface
20 Thrust Roller Bearing
21, 73, 85, 92 Pocket
22, 57 Through Bore
23, 24 Annular Portion
25, 93, 94 Pillar
26, 27, 28 Roller Stopper
31, 32, 33, 34, 61, 62, 63, 64, 86 Disc Portion
36, 37, 38, 39, 66, 67, 68, 69 Cylindrical Portion
41, 74, 82 Radially Outer Area Bent Portion
42, 43, 75, 76, 78 Surface
44, 70, 83 Projecting Portion
45, 77, 84 Corner
51, 52, 71, 95 Pilot Hole
56 Cage Material
72 Edge
79 Groove
101, 102 Holding Member
103 Pressing Member
104, 105, 106 Die
104a Radially Outer End Face
106a Radially Inner End Face
106b Horizontal Face
106c Radially Inner Face
106d Part

The invention claimed is:

1. A thrust roller bearing cage included in a thrust roller bearing and including a plurality of pockets accommodating rollers, comprising:
a radially outer area bent portion formed by bending an area located radially outside the pockets inward in a radial direction; and
projecting portions that are formed in a tip end of the radially outer area bent portion at positions aligned with the pockets and project arcuately such that a tip part as an innermost part of the projecting portion in the radial direction projects inward in the radial direction beyond radially outer edges of the pockets so as to contact end faces of the rollers accommodated in the pockets, the projecting portions having a root part with a width, wherein
the width of the root part of the projecting portion is ⅓ or more and ⅔ or less of a width of the pockets.

2. The thrust roller bearing cage according to claim 1, wherein
the projecting portions projecting arcuately have an arc shape as viewed in plan, and
an arc of the projecting portions has a radius of 0.4 mm or more and 0.7 mm or less.

3. The thrust roller bearing cage according to claim 1, wherein
the tip parts of the projecting portions which are to contact the end faces of the rollers have flat surfaces.

4. The thrust roller bearing cage according to claim 1, wherein
the projecting portions are formed by bending a radially outer area of the cage obliquely inward in the radial direction.

5. A method for manufacturing a thrust roller bearing cage included in a thrust roller bearing and including a plurality of pockets accommodating rollers, comprising the steps of:
preparing a cage material that will later become the thrust roller bearing cage;
forming an outer shape of the cage material so that the outer shape has portions that will later become projecting portions projecting inward in a radial direction beyond radially outer edges of the pockets so as to contact end faces of the rollers accommodated in the pockets;
forming the pockets in the cage material; and
forming a radially outer area bent portion by bending an area of the cage material which is located radially outside the pockets inward in the radial direction, wherein
in the step of forming the outer shape, the outer shape is formed so as to have the portions that will later become the projecting portions having a width at a root part of the projection portions, wherein the width of the tooth part is ⅓ or more and ⅔ or less of a width of the pockets, each projecting portion projects arcuately so that a tip part of a tip end of each projecting portion contacts the end face of the roller.

6. The method for manufacturing the thrust roller bearing cage according to claim 5, wherein
in the step of forming the outer shape, the outer shape is formed so as to have the portions that will later become the arcuate projecting portions having an arc shape with a radius of 0.4 mm or more and 0.7 mm or less as viewed in plan.

7. The method for manufacturing the thrust roller bearing cage according to claim 5, further comprising the step of:
press-flattening areas of the projecting portions which are to contact the end faces of the rollers.

8. The method for manufacturing the thrust roller bearing cage according to claim 5, wherein
in the step of forming the radially outer area bent portion, the area of the cage material which is located radially outside the pockets is bent obliquely inward in the radial direction.

9. A method for manufacturing a thrust roller bearing cage included in a thrust roller bearing and including a plurality of pockets accommodating rollers, comprising the steps of:
preparing a cage material that will later become the thrust roller bearing cage;
forming an outer shape of the cage material so that the outer shape has portions that will later become projecting portions projecting inward in a radial direction beyond radially outer edges of the pockets so as to contact end faces of the rollers accommodated in the pockets;
forming the pockets in the cage material; and
forming a radially outer area bent portion by bending an area of the cage material which is located radially outside the pockets inward in the radial direction, wherein
in the step of forming the outer shape, the outer shape is formed so as to have the portions that will later become the projecting portions having a width that is $1/3$ or more and $2/3$ or less of a width of the pockets; and
press-flattening areas of the projecting portions which are to contact the end faces of the rollers.

* * * * *